United States Patent [19]

Harris

[11] 3,911,892
[45] Oct. 14, 1975

[54] STOVE CONSTRUCTION
[76] Inventor: Garrett H. Harris, 157 S. Denver St., Jackson, Miss. 39209
[22] Filed: June 12, 1973
[21] Appl. No.: 369,133

[52] U.S. Cl............. 126/9 R; 126/25 A; 126/25 B; 99/372
[51] Int. Cl.².... F24C 1/16; A47J 37/00; F24B 3/00
[58] Field of Search...... 126/25 R, 25 A, 25 B, 9 R, 126/9 B; 99/339, 340, 372

[56] References Cited
UNITED STATES PATENTS

| | | | |
|---|---|---|---|
| 3,182,585 | 5/1965 | Rensch et al. | 126/25 A X |
| 3,433,211 | 3/1969 | Latta | 126/25 R |
| 3,494,349 | 2/1970 | Allen | 126/25 R |
| 3,717,137 | 2/1973 | Moline et al. | 126/25 B |

FOREIGN PATENTS OR APPLICATIONS

| | | | |
|---|---|---|---|
| 1,414,620 | 11/1964 | France | 126/25 R |

Primary Examiner—William F. O'Dea
Assistant Examiner—Harold Joyce
Attorney, Agent, or Firm—James W. Pearce; Roy F. Schaeperklaus

[57] ABSTRACT

A stove having a base on which a pair of fire pans is pivotally mounted. A channel shaped damper element is mounted on the base underlying the fire pans. When the fire pans are in an upright position, perforations in main walls thereof permit a draft into a space therebetween for starting a fire. When the fire pans are in a lowered operative position, the main walls engage the damper element, and the damper element closes the perforations. Latches hold the fire pans in upright position. Grills can be mounted on the base overlying the fire pans in operative position.

17 Claims, 8 Drawing Figures

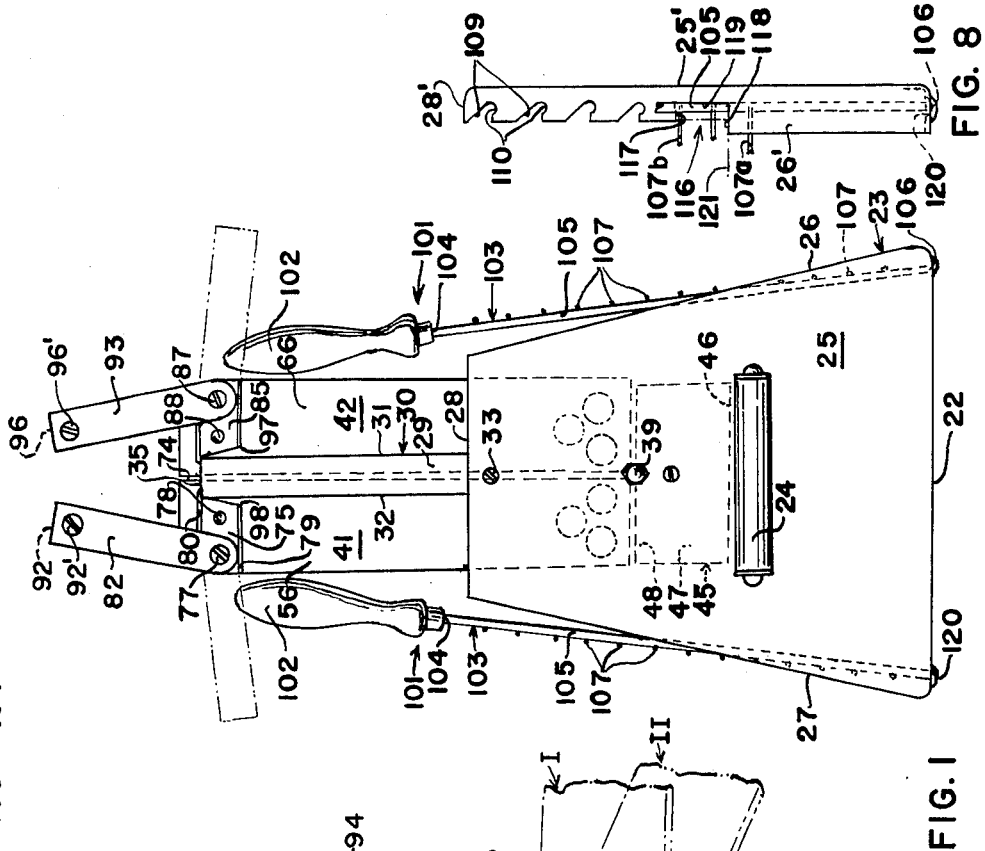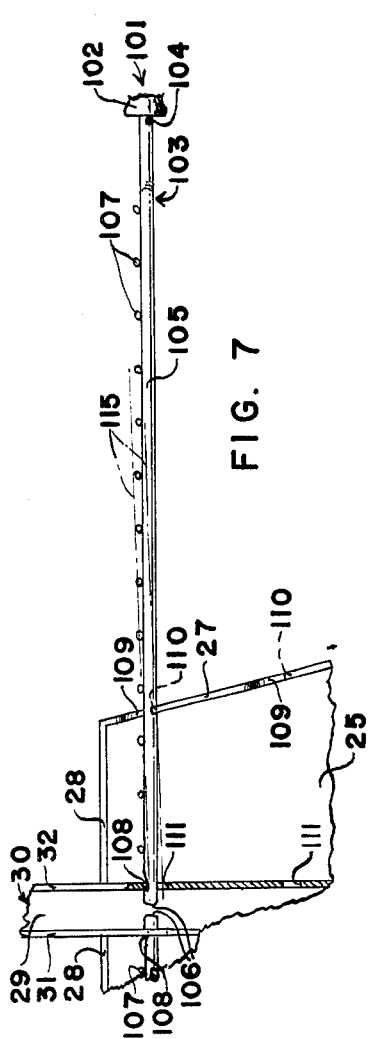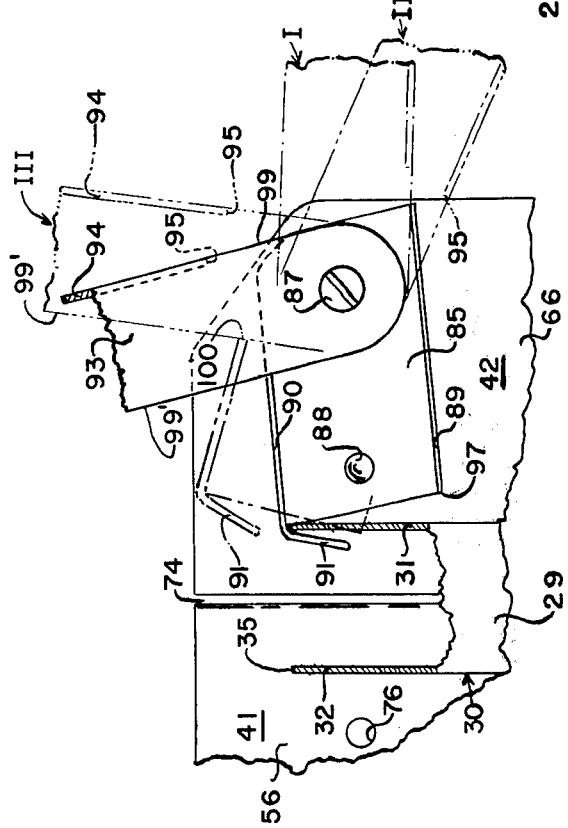

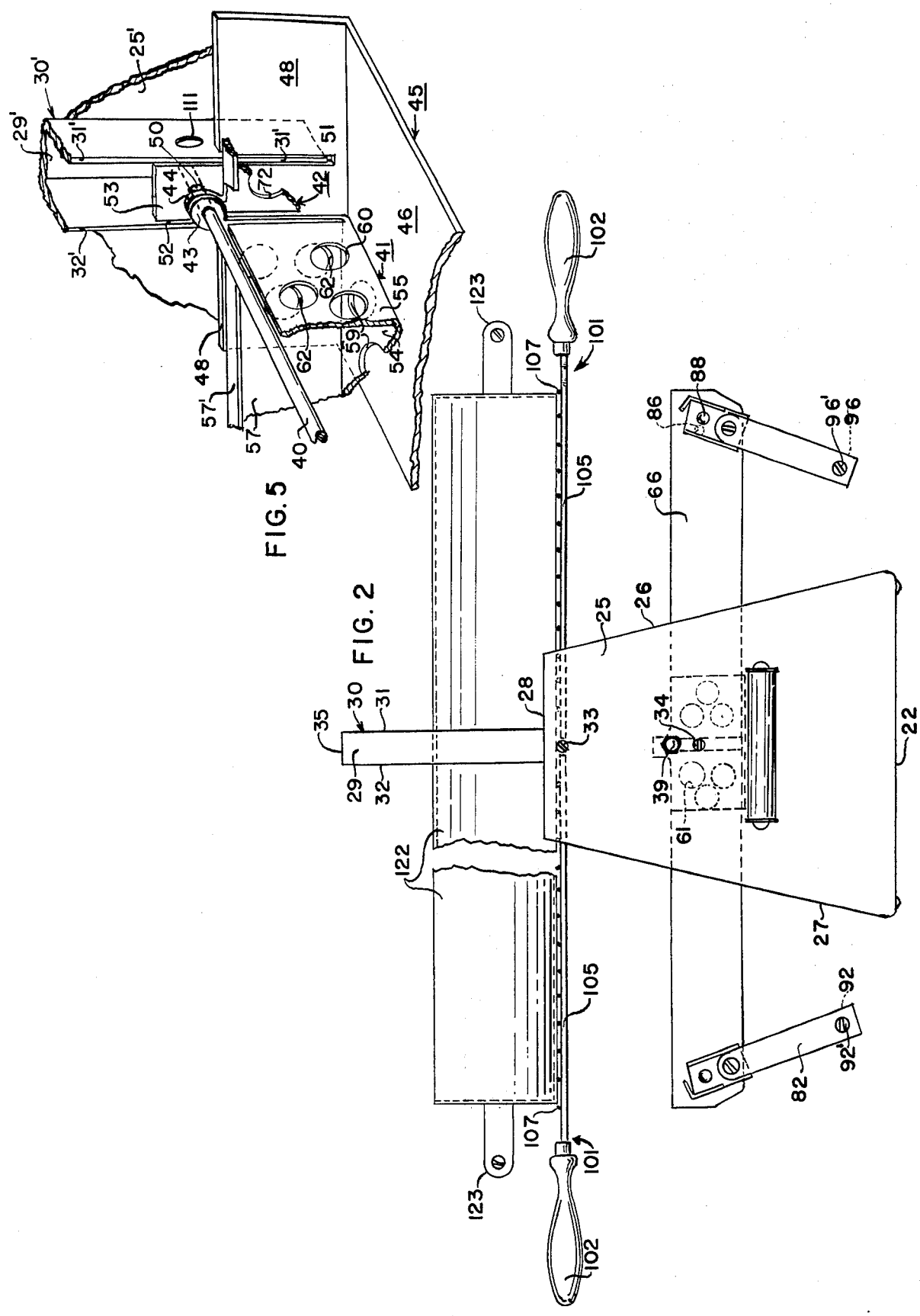

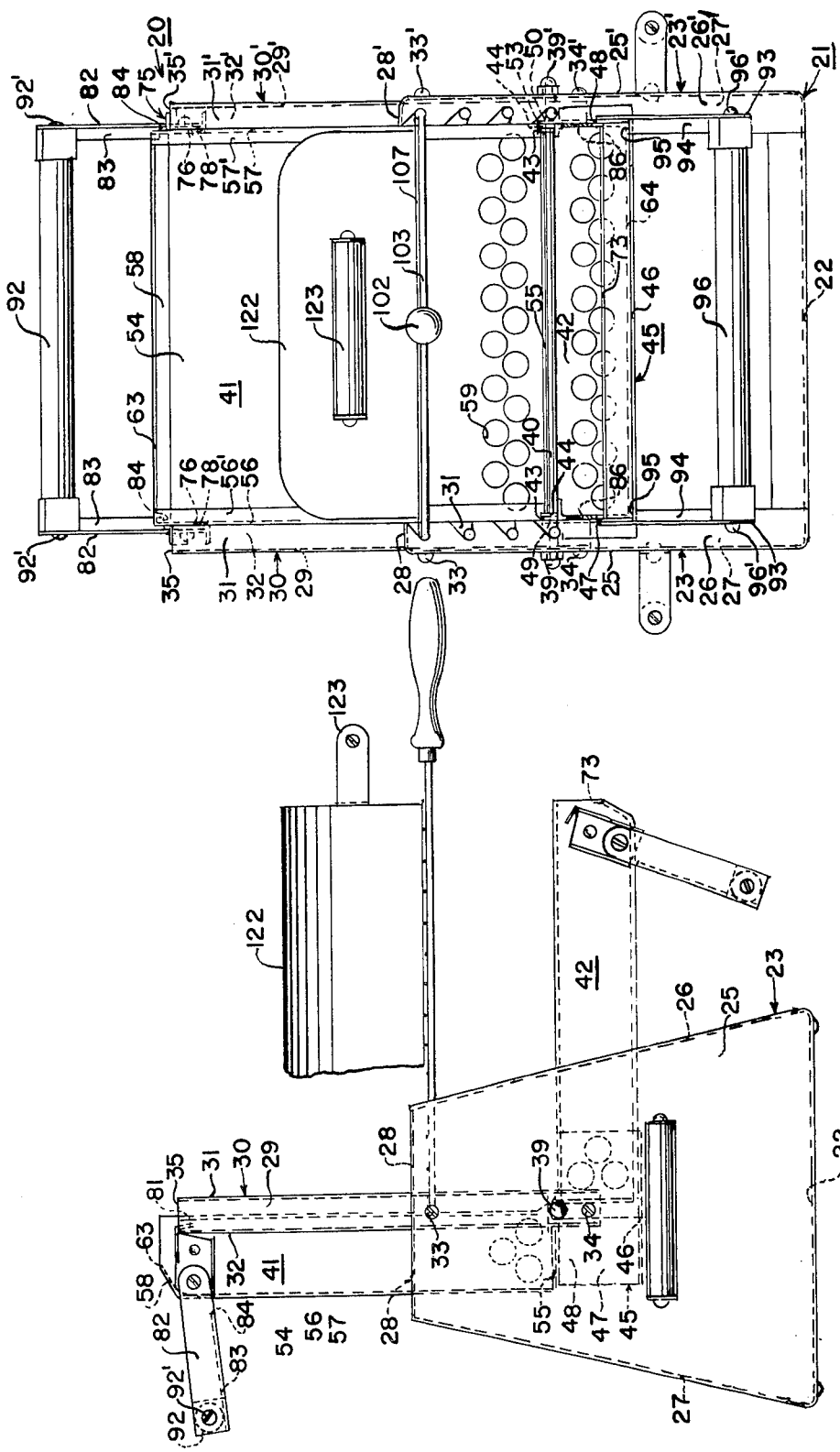

STOVE CONSTRUCTION

This invention relates to solid fuel cooking stoves and, more particularly, to such stoves which are light in weight and readily transported for use by outdoorsmen.

An object of this invention is to provide a lightweight solid fuel stove which folds for easy portability.

Another object of this invention is to provide a stove of the foregoing character which may be used as a carrying receptacle for the fuel.

A further object is to provide in a device of the foregoing character fire pans which fold into face-to-face relation to form a flue-like fuel-lighting chamber for rapidly igniting the fuel and simultaneously substantially cleaning residual grease and the like from the fire pans.

A further object of this invention is to provide a device of the foregoing character in which the fire pans are individually releasable and swingable from upright ignition chamber forming position to a horizontal cooking position.

A further object of this invention is to provide a device of the foregoing character having fire pans so arranged that when a small cooking area is desired, one pan may be lowered into horizontal position and when a larger cooking area is desired, both fire pans may be simultaneously lowered into horizontal cooking position such that the ignited solid fuel either settles into the one pan or is divided to fall in substantially equal amounts into both pans.

A further object of this invention is to provide in a device of the foregoing character a stirrup damper which substantially closes draft ports in the sides and bottom of each fire pan when the latter is in the horizontal cooking position.

A further object of this invention is to provide in a device of the foregoing character a plurality of adjustable grills for supporting objects to be heated, each grill being supportable in selectable elevated positions over a respective fire pan and readily repositioned from one position to such other selectable position as may be desired.

A further object of this invention is to provide a device of the foregoing character having a hood supportable on the grills to provide for oven-like cooking of foods supported by the grill thereunder, when desired, and, invertible for use in boiling or deep fat frying of foods when desired.

The above and other objects and features of the invention will in part be obvious and in part be apparent to those skilled in the art to which this invention pertains from the following detailed description and the drawings of what presently appears to be a preferred embodiment of the invention.

Like reference characters indicate like parts in the following detailed description and the drawings, in which:

FIG. 1 is a view in side elevation of a preferred embodiment of the instant invention in solid fuel stoves, showing the preferred embodiment in condition for transport in full lines and with fuel ignition positions of some parts being indicated in dot-dash lines;

FIG. 2 is a view in side elevation of the device of FIG. 1 in fully opened condition as for cooking or other heating use;

FIG. 3 is a view in side elevation of the device of FIG. 1 with one fire pan raised and the other fire pan in horizontal opened condition to provide reduced area for cooking or other heating use;

FIG. 4 is a view in end elevation of the device shown in FIG. 3;

FIG. 5 is a fragmentary view in perspective of some details of construction relating to cooperation of fire pans, bottom draft damper and support therefor;

FIG. 6 is a fragmentary view in side elevation, partly in section, of latch and related structure;

FIG. 7 is a fragmentary view showing grill cooperation with the stove base when in relation for supporting objects over a fire pan;

FIG. 8 is a fragmentary view in end elevation of the device shown in FIG. 1.

The stove 20 illustrated in the drawings has a base 21. The base 21 has a generally horizontal bottom section 22 which joins two upright sides 23, 23'. Base side 23 has a generally trapezoidal major panel 25 which extends vertically from base 22 of which it may be either an integral extension or to which it may be secured as by welding or the like. Side flanges 26 and 27 extend at right angles from panel 25 toward side 23' and extend from the bottom section 22 to horizontal top flange 28 which also extends toward base side 23'. Channel member 30 is supported in upright position with the lower portion of its web 29 lying in face-to-face relation to the inwardly facing side of panel 25 against which it is secured by fasteners such as rivets or screws 33, 34. The flanges 31, 32 of channel member 30 extend perpendicularly to panel 25 and extend toward the opposite base side 23'. Horizontal top flange 28 is notched centrally to receive channel member 30 which extends a substantial distance above flange 28 to channel end 35.

Base side 23' is a duplicate of base side 23, while the channel 30' secured to it is a duplicate of corresponding channel 30, and parts of each thereof will be designated by primed reference characters corresponding to those applied to portions of base side 23 and channel 30.

Rod 40 has nuts 39, 39' or the like on its ends. Rod 40 extends from nut 39 horizontally through and is supported in horizontal position by base sides 23 and 23'. Rod 40 also extends through the webs 29 and 29' of channel members 30, 30' which are respectively secured in fixed relation against the inner faces of base side panels 25 and 25'. A pair of fire pans 41, 42, each having an integral pair of apertured ears, those on fire pan 41 being ears 43 and those on pan 42 being ears 44, are pivotally mounted on rod 40 which passes through the apertures in those ears. It is preferred that ears 43 are each correspondingly positioned with reference to an ear 44 so that in the event uneven expansion or contraction of the pans widthwise alters the spacing of the ears, such change in spacing does not result in bending or distortion of ears 44.

A stirrup-form damper 45 has a long flat platelike section 46 forming a horizontal bottom of the damper and upright side panels 47, 48 having apertures 49, 50 through which rod 40 extends outboard of the fire pan ears 43, 44. As shown in FIG. 3, slots 51 and 52 are provided in side panel 48 to receive the flanges 31', 32' on channel member 30', and a tongue-like portion 53 between said slots carries the aperture 50 with the result that rocking about rod 40 is substantially precluded by the interference provided by flanges 31', 32' disposed in the slots 51, 52 while thermal expansion or contraction resulting in increased or decreased spacing of stirrup damper side panels 47, 48 is readily permitted by available sufficient space for free expansion and contraction movement longitudinally of rod 40 between channel webs 29, 29'. Side panel 47 has slots corresponding to slots 51, 52 and same correspondingly receive and cooperate with flanges 31, 32 of channel member 30.

Fire pan 41 has a main or bottom panel 54, a perforated end wall 55, side walls 56 and 57, and opposite perforated wall 55 is a sloping wall 58 extending from panel 54 to edge 63. Walls 56 and 57 respectively have flanges 56' and 57' substantially parallel to but spaced from bottom or main panel 54. Ears 43, mentioned earlier, are preferably integral extensions of the walls 56 and 57 and, as previously noted, serve to journal the fire pan 41 for swinging movement about rod 40 between upright and horizontal positions. During such swinging movement, the free edges of flanges 32, 32' of the upright channels 30, 30' serve as guides, as some portion of adjacent side wall 56 or 57 is in close spaced or contacting overlying relation to some portion of those flange edges at all times. The opposed edges of flanges 32, 32' are spaced apart a distance slightly greater than the width of the fire pan 41 over walls 56, 57 thereof.

Draft perforations or apertures 59 are provided in main panel 54 adjacent end wall 55. End wall 55 is provided with similar apertures 60. Side walls 56 and 57 are provided with similar apertures 61 and 62, respectively, in portions of those walls immediately adjacent end wall 55. It may be noted that apertures 59, 61 and 62 are substantially covered by portions 46, 47 and 48 of stirrup damper 45 when fire pan 41 is in the lowered portion illustrated in FIG. 2, but are exposed so that air may freely flow therethrough when the fire pan 41 is in the raised position in which it is shown in FIGS. 1, 3, 4, and 6.

Fire pan 42 is a substantial duplicate of fire pan 41. Fire pan 42 has a main or bottom panel 64, a perforated end wall 65, side walls 66 and 67 respectively having flanges 66' and 67' spaced from and substantially parallel to main or bottom panel 64. A sloping wall 68 extends from bottom panel 64 toward the plane of flanges 66', 67' but terminates in edge 73 spaced from that plane. Draft apertures 69 are provided in main panel 64 adjacent perforate end wall 65 which has draft apertures 70. Also adjacent to end wall 65, draft apertures 71 are provided in wall 66 and draft apertures 72 are provided in side wall 67.

When the fire pans 41 and 42 are in the horizontal position, as shown in FIG. 2, and fragmentally in FIG. 5, the perforated end walls 55, 65 are in substantially parallel face-to-face close spaced relation to each other and stirrup damper 45 closely bounds the side and lower limits of that spacing so it in effect precludes any substantial draft through the apertures 60, 70 in the perforate end walls except insofar as gaseous fluids may flow from one fire pan into the other, while stirrup damper 45 also substantially closes by spanning in close spaced relation the draft apertures 59, 61, 62, 69, 71, 72.

When fire pans 41 and 42 are in the position shown in FIG. 1, the several draft apertures 59, 60, 61, 62, 69, 70, 71, 72 are all exposed, that is, flow of air therethrough is undamped by stirrup damper 45.

Fire pans 41, 42 are secured in the upright position illustrated in FIG. 1 by means of latches 75, 85 which secure them against pivotal movement about rod 40 and with portions thereof between the edges of channels 30, 30', namely, the free edges of the flanges 31, 32 and 31', 32', such that the channels bridge the small gap 74 provided between the then substantially parallel opposed flanges 56', 66' and 57', 67'. The gap 74 is provided to permit accommodation at expansion or contraction of the fire pans incident to substantial temperature changes to which they are subjected in the normal use of the device.

Latch 75 is pivotally mounted on a post rivet, screw or the like 77 and has a dimple 78 which provides a dome-shaped protuberance on the side of the latch adjacent to wall 56, a substantially full-length unlatching abutment flange 79 and a short relatching abutment flange 80 which extends angularly to form a latch torque 81. A pair of latch members 75 are provided, one as shown mounted adjacent the outer surface of side 56, and the other as indicated in FIG. 4 adjacent the outer surface of side wall 57. An aperture or recess 76 (FIG. 6) is provided in wall 56 to receive and hold dimple 78 when latch 75 is in the latched position in which it is shown in FIGS. 1, 3 and 4. A similar aperture or recess is also provided in wall 57 to cooperate in like manner with the latch 75 adjacent said wall.

Latch 85 is mounted by means of post screw, rivet or the like 87 in pivoting relation adjacent side wall 66 of fire pan 42. Latch 85 has a dimple 88 which is a dome-shaped protuberance on the side adjacent fire pan side wall 66, a substantially full length unlatching abutment flange 89 and a short relatching flange 90 which extends angularly to form a latch tongue 91. A pair of latch members 85 are provided, one as shown mounted adjacent the outer surface of side 66 and the other as indicated in FIG. 4 adjacent the outer surface of side wall 67. An aperture or recess 86 (FIGS. 2 and 4) is provided in wall 66 to receive and hold dimple 88 when latch 85 is in the latched position in which it is shown in FIGS. 1 and 6. A similar aperture or recess 86' is also provided in wall 67 to cooperate in like manner with the latch 85 adjacent said wall.

Each latch 75 is provided with an operating lever 82 which is also pivotally mounted on post screw 77 and has a stop flange 83, end 84 of which is a stop abutment which may be moved into engagement with panel 54 of fire pan 41 to limit swinging of operating lever 82. Each of the operating levers 82 adjacent its outer end is secured by a screw or other fastener 92' to a respective end of handle 92. To provide frictional drag or resistance to swinging movement of operating levers 82 relative to latch 75, a slight amount of twist may be provided in the levers 82 or other suitable friction producing means may be used as desired. Where the frictional resistance is provided by twist in the operating levers 82, handle 92 supports those levers adjacent their outer ends to render the twist effective in producing frictional drag.

Each latch 85 is provided with an operating lever 93 which is also pivotally mounted on post screw 87 and has a stop flange 94, end 95 of which is a stop abutment which may be moved into engagement with panel 64 of fire pan 42 to limit swinging of operating lever 93. Each of the operating levers 93 adjacent its outer end is secured by a screw or other fastener 96' to a respective end of handle 96. To provide frictional drag or resistance to swinging movement of operating levers 93 relative to latch 85, a slight amount of twist may be provided in the levers 93 or other suitable friction producing means may be used as desired. Where the frictional resistance is provided by twist in the operating levers 93, handle 96 supports those levers adjacent their outer ends to render the twist effective in producing frictional drag.

With particular reference to FIG. 6, the operation of latches 85 will now be described. In the initial position in which the fire pans are raised and latched as illustrated in FIG. 1, the latch 85 is in the position in which it is shown in full lines in FIG. 6, and the operating levers 93 are in the position in which the fragment thereof is shown in full lines in FIG. 6, the position in which the levers 93 are shown in full lines in FIG. 1 as well. The levers 93 may be swung in unison by grasping handle 96 to swing lever 93 clockwise about post screw 87 to the position I shown in FIG. 6 in dot-dash lines. As operating levers 93 are moved into position I by manipulation of handle 96, the edge 99 of lever 96 moves into abutting relation with the unlatching abutment flange 89 of latch 85. As dimple 88 is held in aperture 86 in wall 66 of fire pan 42 when latch 85 is in the full line position of FIG. 6, a substantial increase in resistance is experienced to swinging of operating lever 93 beyond position I. When handle 96 is swung further to move operating lever 93 clockwise beyond the position I, latch 85 will swing in unison therewith about the pivot screw 87, with the result that dimple 88 will swing upwardly and out of aperture 86 causing slight canting of the dimpled portion of lever 85 toward the viewer observing the mechanism as viewed in FIG. 6. As the dimple 88 moves out of registry and engagement with aperture 86 in pan wall 66, the tongue 91 also swings upwardly away from the top edge 35 of the channel 30 on the one side and the corresponding end edge of channel 30' on the other side. Such clockwise movement of operating lever 93 past position I may proceed until the lever 93 reaches the position II in FIG. 6 wherein abutment end 95 of flange 94 engages main panel 64 of fire pan 42. As shown in FIG. 6, when operating lever 93 is in dot-dot-dash position II, tongue 91 is in fully released position shown in dot-dot-dash lines in FIG. 6. As lever 93 swings from the position I to the position II in FIG. 6, cam end 97 of flange 89 moves into engagement with the opposed face of the channel flange 31 and riding upwardly in engagement with that face initiates swinging of the fire pan 42 about rod 40 in a clockwise direction as viewed in FIG. 6. The extent of such initial cammed movement is indicated by the overlap of the dot-dot-dash showing of said portion of latch 85 in FIG. 6. The cooperation between abutment end 95 of stop flange 94 with main panel 64 of fire pan 42 also functions to limit swinging of latch 85 so as to retain tongue 91 in a protected position adjacent to the side of fire pan 42.

When the operating lever 93 and latch 85 are in the dot-dot-dash position II shown in FIG. 6, the fire pan 42 may be swung to the position in which it is shown in FIGS. 2, 3, 4, and 5.

Similar operation of latches 75 by manipulation of handle 92 unlatches and camingly moves fire pan 41 counterclockwise from the position in which it is shown in FIGS. 1, 3, and 6 such that it may be swung to its horizontal position illustrated in FIGS. 2 and 5. When the latches 75 and 85 are in the fully unlatched position in which they are illustrated in FIG. 2, or in the event only fire pan 42 is unlatched and lowered, then, as shown in FIG. 3, the lowered fire pan or pans as the case may be, may be raised toward transport and ignition position by exerting upward force upon the respective handles 92 and 96 until the cam end 97 of flange 89 and cam end 98 of flange 79 engage the respective opposed faces of flanges 31, 31', 32, 32'. Further movement of the fire pans will follow with movement of the operating levers 82 and 93 into the raised full line position in which they are shown in FIG. 1. Referring particularly to FIG. 6, operating lever 93 is swung from the dot-dot-dash line position II counterclockwise into the dot-dot-dash line position III wherein edge 99' of lever 93 moves into abutment with end 100 of flange 90 such that further counter-clockwise movement of lever 93 from position III into the full line latched position in FIG. 6 results in corresponding swinging of latch 85 about post screw 87 until the base of latch tongue 91 engages edge 35 of flange 31 to preclude further movement and in which position dimple 88 has re-entered and is held in aperture 86 in the side wall 66 of fire pan 42. The pair of latches 85 on fire pan 42 is operated in unison and thus latch both sides of fire pan 42 in a pre-indexed position relative to the channels 30, 30'. The latches 75 operate in like fashion and may be operated simultaneously with the latches 85, or the latches associated with each fire pan may be operated in a fashion which results in latching of the fire pans individually or serially rather than in unison.

As shown in FIG. 1, a pair of grills is provided and stored in an upright position when the stove 20 is in transport condition. Each of the grills 101 is provided with a wooden or other heat insulative handle 102 from which a fork-like frame 103, preferably of stainless steel, extends. The tang 104 of the frame 103 is secured in the handle 102 while the arms 105 thereof extend laterally and then in parallel relation away from the handle 102 to free ends 106. Grid wires 107 extend in parallel spaced relation to eachother transversely of the frame 103 with their respective ends secured to respective arms 105 of the frame. As shown in FIG. 7, a notch 108 is provided in the upper surface of each of the frame arms 105 adjacent the free ends 106 thereof.

As shown in FIGS. 4, 7, and 8, flanges 26, 26', 27, 27' have grill receiving rest notches 109, portions 110 whereof are formed to indexingly cooperate with grill frame arms 105. Respective apertures 111 are provided in flanges 31, 31', 32, 32' to receive end portions of grill frame arms 105 as shown in FIG. 7, that is, the apertures III are slightly larger in cross-section than an arm 105, and when the grill arm 105 rests in portion 110 of notch 109 while the grill is horizontal, parallel to the plane of the top of the subjacent fire pan, the notch 108 in the arm 105 receives a portion of the flange 32 adjacent the top of the aperture 111. An axial movement of the grill to the right of the position shown in FIG. 7 is mechanically precluded. Leftward movement of the grill from the position shown in FIG. 7 is limited to the closing of the short distance between the opposed grill ends 106, if an opposed grill is present, and by a grid wire 107 engaging flange 32 in the event an opposed grill is not present.

The grill is easily positioned as desired by placing each of the arms 105 in a respective portion 110 of a pair of notches 109 and sliding the grill at a slight downward tilt (indicated by dot-dash lines 115 in FIG. 7) until arm ends 106 enter into the related apertures 111 far enough that tilting of the grill to engage the grill arms 105 with the flange 32, 32' at the tops of the apertures 111 followed by reverse sliding of the grill, that is, to the right as viewed in FIG. 7, will bring the notch 108 and the flanges 32, 32' into full engagement. Removal of the grill 101 involves raising the handle 102 sufficiently to disengage the flanges 32, 32' from the notches 108 and withdrawing the grill. It should be noted that the configuration of notches 109 provides clearance for the grid wires 107 (secured to the upper sides of the arms 105) during sliding installation and sliding removal of the grills.

When the grills 101 are desired to be substantially coplanar, as in FIGS. 2 and 7, they are placed in appropriately selected supporting notches 109 and apertures 111. However, one of the grills can be put aside and the other mounted in a horizontal position such as the uppermost position illustrated in FIGS. 3 and 4, or a lower position corresponding to any other appropriate pairs or sets of lower notches 109 and apertures 111 shown in FIGS. 4, 7, or 8.

As shown in FIG. 8, a generally rectangular notch 116 is provided in flange 26' for storing a grill 101 for transport, as shown in FIG. 1, and like corresponding notches are provided in flanges 26, 27 and 27'. Notch 116 has a horizontal upper edge 117, horizontal lower edge 118 and an upright edge 119 extending from edge 117 to edge 118. The opposed edges 118 of notches 116 in flanges 26, 26' are spaced slightly farther apart than the width of the grill over arms 105 and the latter extend uprightly through the notches 116. Sockets 120 are provided in the horizontal panel of base bottom 22, each socket indexingly receiving and holding a respective free end 106 of a grill arm 105 when the grill arms 105 extend through notches 116 in close spaced or contacting relation to the upper and lower edges 117, 118 thereof. The grid wires 107 of the grill are preferably so positioned on the arms 105 that when grills 101 are positioned with the grid wires 107 thereof facing outwardly, as shown in FIG. 1, the grid wire 107a tends to cooperate with the under face of flange 26' below notch edge 118, and, when the grills 101 are positioned with grid wires 107 facing inwardly, opposite from the showing of FIG. 1, the grid wire 107b is subjacent notch edge 117 in a position to engage that edge upon slight raising of the grid from the position shown in FIG. 8. As a result of such location of grid wires 107a and 107b, they tend to engage the flange 26' and preclude substantial upward movement of the grill 101 and thus tend to supplement the force of gravity in keeping the ends 106 thereof engaged in sockets 120. The under side of the sockets 120 also function as feet portions of the stove base 21.

The lower edge 118 of each notch 116 is longer and serves as a stop abutment and rest for a fire pan as well, for example, as shown in FIG. 8 where the FIG. 3 position of a portion of fire pan 42 is shown by dot-dash line 121.

The grills alone are suitable for many food cooking and other heating uses, but for baking, boiling, deep-frying and similar heating and cooking operations, I prefer to provide a long metal vessel 122 as illustrated in FIGS. 2, 3, and 4. Vessel 122 as shown has a body 123 substantially equal in length to the distance or span of the surface or array of grid wires 107 in FIG. 2, and of a D-shape in section such as is shown in FIG. 4. As shown in FIGS. 3, 4, and the right-hand portion of FIG. 2, vessel 122 is in open-face-down attitude for baking and for slow grilling of items such as pork, chicken, or the like, while as shown in the left-hand portion of FIG. 2 the vessel 122 is in open-face-up attitude for deep-frying and boiling. While I prefer to use stainless steel able to withstand high temperatures well, I prefer that vessel body 122 be of metal such as aluminum alloy having greater heat conducting character as well as good ability to withstand elevated temperatures of cooking.

Handles 123 are provided on the ends of vessel 122 for handling it. The channels 30, 30' indexing and lateral support against substantial lateral shifting of the vessel 122 when resting on the grills in the high-level positions. The base sides 23, 23' also provide additional indexing and support against substantial lateral shifting when the grills are in lower positions.

A pair of handles 24, 24' are preferably provided on base sides 23, 23' with grip portions located so as to remain cool and provide a good balanced controlling grip on the stove. By grasping handles 24, 24', the stove may be carried, but primarily the handles are intended for use in handling the stove to, after removal of the grills, turn it upside down and shake out the coals and ashes as may then be in the fire pans.

The stove would normally be stored in the condition illustrated in FIG. 1 in full lines. In such condition the fire pans 41, 42, substantially meeting between the channels 30, 30' to which they are latched, form a tall chimney-like chamber having a mouth at the top thereof of substantial width between edges 63, 73 and side walls 56, 57, 66, 67. The handles 92 and 96 are swung aside while charcoal, charcoal briquets, or such other solid fuel may be desired to be used in the stove, may be poured or dropped into the chamber formed by pans 41, 42. The capacity of the chamber is such that it will hold a sufficient amount of fuel for one normal cooking operation with charcoal. The space within the base 21 between the stored grills 101 and outside the fire pans 41, 42 may be used to carry any other supplies as may be desired. The stove may be carried by grasping the handles 92, 96 in a hand and, being narrower at the top as shown in FIG. 1, tends to conform to the body contour of the person carrying it.

When the place of use is reached, the stove is set so the base bottom section 22 is level. Grills 101 are lifted, with slight flexing if necessary, to disengage ends 106 from sockets 120 and then slid upwardly out of notches 116 with the smooth sides of the arms 105, opposite grid wires 107, riding against the adjacent edge 117, when the grills are initially as shown in FIG. 1, or against edge 116 when the grills are in a reversed position. The grills are laid aside when removed and handles 92, 93 swung to the dot-dot-dash line positions in FIG. 1 (position I in FIG. 6). Any supplies carried in the base are removed and the fuel in the ignition chamber formed by fire pans 41, 42 in FIG. 1 is ignited. Charcoal lighter fluid may be used or a wad of paper may be placed on the stirrup damper 45 beneath the fire pans and ignition initiated by lighting with a match. Ignition flame and draft air enter the bottom of the ignition chamber through apertures 60, 70 in horizontal coplanar perforate end walls 55, 65 forming the bottom of the ignition chamber and adjacent apertures 59, 79 in upright main or bottom panels 54, 64 adjacent apertures 61, 62, 71, 72 in the lower end portions of upright side walls 56, 57, 66, 67 of fire pans 41, 42. The chimney effect of the fire pan formed ignition chamber results in the fuel therein rapidly catching fire. The handles 92, 96 being disposed in positions laterally spaced from the ignition chamber, remain cool. Once the fuel is on fire, handles 92, 96 are swung downwardly from the dot-dot-dash line positions in FIG. 1 to positions corresponding to position II in FIG. 6, unlatching the latches 75, 85 and cam initiating outward-downward swinging of the fire pans 41, 42, and the fire pan swinging is continued until the pans come to rest against lower edges 118 of notches 116. During downward swinging of the fire pans, the ignited fuel falls or settles into the fire pans in about equal amounts. The handles 92, 96 are in limit positions as shown in FIG. 2, and brace the stove against tilting to the left or right as viewed in FIG. 2 (the side walls of the fire pans frictionally engage the edges of flanges 26, 26', 27, 27' of the base sides and tend to remain in the relation in which they are shown in FIG. 2).

The grills 101 may then be installed at a desired elevation above the respective fire pans 41, 42 and cooking proceeded with. While draft air for the fuel flows in over the tops of walls 56, 57, 63, 66, 67, 73, the stirrup damper 45 then closes the draft apertures in the fire pans.

When use of the stove is completed, the grills 101 are removed and laid aside, the stove grasped by handles 24, 24' and turned upside down to dump the ashes and any remaining coals out of the fire pans, and the stove restored to the condition illustrated in FIG. 1 with grills in position for transport.

Having described what presently appears to be a preferred embodiment of the instant invention, it will in part be apparent and in part be obvious that changes may be made in the illustrative embodiment without departing from the spirit and scope of the invention.

Having described my invention, what I claim as new and desire to secure by letters patent is:

1. A solid fuel stove comprising in combination a base, a pair of fire pan means pivotally supported on the base and swingable between an open-face-to-open-face fuel-ignition-chamber-forming-relation and an end-to-end aligned open-face-up burning fuel holding relation, upper portions of the fire pan means in fuel-ignition-chamber-forming-relation forming an upright hollow enclosure having an upper open-mouth, there being air inlet means provided in the lower portions of each of fire pan means in fuel-ignition-chamber-forming-relation to permit entry of air into the enclosure.

2. A solid fuel stove comprising in combination a base, a pair of fire pans pivotally supported on the base and swingable between open-face-to-open-face fuel-ignition-chamber-forming-relation and end-to-end aligned open-face-up burning fuel holding relation, draft apertures being provided in the portions of the fire pans which are lowermost when the fire pans are in ignition-chamber-forming-relation and a stirrup damper adapted to receive the apertured portions of the pans and close the draft apertures in the pan walls in face-to-face relation thereto when the pans are in end-to-end aligned open-face-up relation.

3. A solid fuel stove comprising in combination a base, a pair of fire pans pivotally supported on the base and swingable between open-face-to-open-face fuel-ignition-chamber-forming-relation and end-to-end aligned open-face-up burning fuel holding relation, latch means provided on each fire pan, a handle provided on each fire pan, the latch means being in latched relation when the fire pans are in ignition-chamber-forming-relation and cooperate with the fire pan to provide an indexing abutment for positioning the handle during ignition of fuel, the handle having stop means for cooperation with the fire pan to index the latch means in protected relation to the fire pan while unlatched, the latch means camming the fire pan toward the aligned open-face-up relation as the handle is moved from the ignition position to the position wherein the latch means is unlatched.

4. A stove in accordance with claim 3 in which a charge of fuel may be stored and then ignited when desired in the fuel-ignition chamber formed by the fire pans and then while burning distributed substantially equally to the two fire pans as they are simultaneously swung into end-to-end open-face-up burning fuel holding relation.

5. A stove in accordance with claim 4 in which draft apertures are provided in the portions of the fire pans which are lowermost when the fire pans are in ignition-chamber-forming-relation and a stirrup damper is provided and receives the apertures portions of the pans and closes the draft apertures in the pan walls in face-to-face relation thereto when the pans are in end-to-end aligned open-face-up relation to promote even combustion of the fuel in the fire pans.

6. A stove which comprises a base, channel shaped damper element mounted on the base with flanges of the damper element extending upwardly, a pair of fire pans pivotally mounted on the flanges of the damper element, each of the fire pans including a main wall and an auxiliary wall extending substantially at right angles to the main wall, there being perforations in the main walls of the fire pans, the fire pans swinging between an upright position in which the main walls of the fire pans are in spaced substantially parallel relation and the auxiliary walls close lower ends of the fire pans and an operative position in which the main walls engage the damper element to close the perforations in the main walls, the perforations providing a draft through the space between the fire pans when a fire is started in that space.

7. A stove as in claim 6 wherein there are upright channel shaped latch keeper members mounted on the flanges of the damper element and latch members are mounted on the fire pans and engageable with flanges of the latch keeper members when the fire pans are in upright position to hold the fire pans in upright position.

8. A stove as in claim 6 wherein means is provided for mounting a grill on the base and overlying the fire pans in operative position.

9. A solid fuel stove comprising in combination a base, a pivot means mounted thereon, a stirrup damper mounted on said pivot means, means limiting pivotal movement of the stirrup damper while leaving same free to shift longitudinally on said pivot means, a pair of fire pans pivotally supported on the base and between portions of said stirrup damper by the pivot means and swingable between open-face-to-open-face fuel-ignition-chamber-forming-relation and end-to-end aligned open-face-up burning fuel holding relation.

10. A stove in accordance with claim 9 in which latch means are provided on each fire pan, a handle is provided on each fire pan, the latch means is in latched relation to the base when the fire pans are in ignition-chamber-forming-relation and cooperate with the fire pan to provide an indexing abutment for positioning the handle during ignition of fuel, the handle having stop means for cooperation with the fire pan to index the latch means in protected relation to the fire pan while unlatched, the latch means camming the fire pan toward the aligned open-face-up relation as the handle is moved from the ignition position to the position wherein the latch means is unlatched.

11. A stove in accordance with claim 9 in which draft apertures are provided in the portions of the fire pans which are lowermost when the fire pans are in ingition-chamber-forming-relation and a vent is defined by the upper portions of the fire pans when in ignition-chamber-forming-relation, the stirrup damper receiving the apertured portions of the pans and closing the draft apertures in the pan walls in face-to-face relation thereto when the pans are in end-to-end aligned open-face-up relation.

12. A stove in accordance with claim 11 in which latch means are provided on each fire pan, a handle is provided on each fire pan, the latch means is latched relation to the base when the fire pans are in ignition-chamber-forming-relation and cooperate with the fire pan to provide an indexing abutment for positioning the handle during ignition of fuel, the handle having stop means for cooperation with the fire pan to index the latch means in protected relation to the fire pan while unlatched, the latch means camming the fire pan toward the aligned open-face-up relation as the handle is moved from the ignition position to the position wherein the latch means is unlatched.

13. A stove in accordance with claim 9 wherein at least one grill is provided, the base has at least one pair of notches to guide and support portions of said grill and is adapted to receive and cooperate with portions of said grill spaced from said notches whereby the grill may be supported in a respective predetermined relation to the base corresponding to the notches and portions of the base spaced therefrom in cooperative relation to the grill.

14. A stove in accordance with claim 13 in which said pair of notches guide the grill in generally horizontal movement and apertures in upright portions of the base receive spaced portions of the grill supported by the base in substantially horizontal relation over a fire pan.

15. A stove in accordance with claim 14 in which the grill has at least one upwardly open notch and a portion of the stove base adjacent one said aperture is cooperatively received therein to secure the grill against sliding movement while supported in horizontal position by the base.

16. A stove in accordance with claim 13 wherein the lower portion of the base has at least one recess for receiving a lower end portion of the grill in upstanding position while said fire pans are in fuel-ignition-chamber-forming relation, the said pair of notches guide the grill in sliding movements and support it in upstanding position while cooperatively received in a said recess.

17. A stove in accordance with claim 16 wherein said grill in upstanding cooperation with said notches and recess has at least one guide member which engages the base adjacent at least one of said notches to bias the grill to remain in cooperating relation to said recess of said base.

* * * * *

UNITED STATES PATENT OFFICE
CERTIFICATE OF CORRECTION

PATENT NO. : 3,911,892
DATED : October 14, 1975
INVENTOR(S) : Garrett H. Harris

It is certified that error appears in the above-identified patent and that said Letters Patent are hereby corrected as shown below:

Claim 6, Column 10, line 32, after "base,"

insert -- a --.

Claim 12, Column 11, line 26, after "is"

insert -- in --.

Signed and Sealed this

*thirtieth* Day of *December 1975*

[SEAL]

Attest:

RUTH C. MASON
*Attesting Officer*

C. MARSHALL DANN
*Commissioner of Patents and Trademarks*

Disclaimer 3,911,892.—*Garrett H. Harris*, Jackson, Miss. STOVE CONSTRUCTION. Patent dated Oct. 14, 1975. Disclaimer filed May 12, 1977, by the assignee, *Newco Fireplace Equipment Limited, Inc.*

Hereby enters this disclaimer to claim 1 of said patent.

[*Official Gazette July 26, 1977.*]